United States Patent [19]

Odermath

[11] Patent Number: 5,637,813
[45] Date of Patent: Jun. 10, 1997

[54] PENDULAR SENSOR WITH UNLIMITED ROTATION ALONG ITS LONGITUDINAL AXIS

[75] Inventor: Jean-Marie Odermath, Beauvallon, France

[73] Assignee: Sextant Avionique, Meudon-la-Foret Cedex, France

[21] Appl. No.: 513,400

[22] Filed: Aug. 10, 1995

[30] Foreign Application Priority Data

Aug. 11, 1994 [FR] France .................... 94 10091

[51] Int. Cl.⁶ .................................. G01R 33/02
[52] U.S. Cl. .............. 73/866.1; 324/244; 33/363 L
[58] Field of Search ................. 73/866.1, 514.36, 73/514.37, 514.12; 324/244, 247, 251, 253–255, 258, 249; 33/361, 355 R, 363 R, 363 L, 365, 366, 391, 397, 401, 402

[56] References Cited

U.S. PATENT DOCUMENTS

| | | | |
|---|---|---|---|
| 2,508,961 | 5/1950 | McNerney | 73/514.37 |
| 2,770,051 | 11/1956 | Dreves | 33/401 |
| 2,924,886 | 2/1960 | Cullen | 33/363 R |
| 3,436,650 | 4/1969 | Hinton | 324/244 |
| 4,961,342 | 10/1990 | Matsumoto et al. | 73/118.1 |

*Primary Examiner*—Robert Raevis
*Attorney, Agent, or Firm*—Plevy & Associates

[57] ABSTRACT

A sensor includes a first pendular system articulated along a first axis, bearing at least one detector, and a second pendular system articulated along a second axis collinear with the first axis. Collector rings are mounted around the second axis, and electrical wires connect the terminals of the detector to the rings.

5 Claims, 3 Drawing Sheets

PENDULAR SENSOR WITH UNLIMITED ROTATION ALONG ITS LONGITUDINAL AXIS

BACKGROUND OF THE INVENTION

1. Field of the Invention

The present invention relates to sensors for detecting an oriented physical variable, and relates more particularly to magnetic field sensors.

The present invention more particularly relates to pendular sensors, i.e., sensors including a pendular system on which at least a detector is disposed, an electronic card, and electric wires to connect the detector to the electronic card.

2. Discussion of the Related Art

The function of the pendular system is to orientate the detector. More particularly, a pendular system having two degrees of liberty (a roll axis and a pitch axis) maintains the detector in a constant horizontal plane. A pendular system having one degree of liberty (only a roll axis) orientates the detector along a constant direction with respect to the sensor.

The main drawback of such sensors originates from the presence of electric wires, which are required to connect the detector, which is mobile, and the sensor electronic card, which is fixed and cannot be mounted on the pendular system. Indeed, the electric wires impair the pendular mechanism and limit the sensor's performances, as will be better understood with relation to the example illustrated in FIG. 1.

FIG. 1 represents an exploded view of a conventional pendular magnetometer 20 having two degrees of liberty, for detecting the two horizontal components of the earth's magnetic field. This detector can be used for the determination of a course, or an orientation, or simply the measurement of a local magnetic field. This magnetometer is, for example used in the field of sub-marine petrol research, in which the presence of oil fields is detected by measuring the echoes caused by an explosion. The measurement is achieved with hydrophones fixed to a sub-marine cable pulled by a ship. Since the orientation of the hydrophones should be known with a high accuracy, and since the cable may be twisted or corkscrewed, several magnetometers of this type are disposed at regular intervals along the cable.

Magnetometer 20 is provided with two magnetic field detectors 1, 2, that are perpendicularly disposed, each detector being assigned to the measurement of one of the two components of the earth's magnetic field. Detectors 1, 2 are mounted on a pendular support 3 articulated with a Cardan system, and is horizontally maintained by a return mass 4. Support 3 is integral of a first axis 6-1 mounted through roll-bearings (with balls, needles, or other suitable means) carried by a frame 7. Frame 7 is in turn integral with a second axis 6-2 guided by roll-bearings carried by the casing 8-1 of the sensor. Hereinafter, the axis carried by the sensor casing 8, in this case axis 6-2, will be called roll axis, and the intermediate axis 6-1 carried by frame 7 will be called pitch axis. Both axes are oriented along perpendicular direction AA' and BB'. The sensor is enclosed in a water-proof casing 8 filled with a damping lubrication oil. Frame 8-1 constitutes the upper portion of the casing 8 whose lower portion is a bowl shaped portion 8-2, accommodating the whole pendular system. The two detectors 1, 2 are connected to an external electronic card 10 fixed on the top of frame 8-1, through conductive wires 5 crossing the casing with water-proof means. Inside the casing, the wires must have a sufficient length to not prevent the pendular system 3 from reaching its horizontal position when the casing is tilted. In addition, to obtain a high accuracy in the horizontal positioning, the rigidity and weight of wires 5 should be as low as possible. Thus, very thin breaded copper wires, covered with a polyester synthetic fiber are conventionally used.

However, these precautions do not avoid the main drawback of the device, which is the highly limited angular movement of the pendular system 3, with respect to the casing, due to the provision of wires. Theoretically, the maximum possible inclination of the sensor with respect to the longitudinal axis is ±180° with respect to the vertical position. In practice, the maximum inclination values are substantially lower, because in the long run maximum inclination causes wires to be excessively worn out and also reduces the reliability of the sensor. That is why the sensor 20 represented in FIG. 1 is designed so that the pendular mass 4 abuts against the bowl 8-2 in case of a high inclination of the sensor, which corresponds to a maximum pitch rotation of 120° (i.e., ±60°). For the same reason, the frame 7 abuts against the casing 8-1, for a maximum roll rotation of 120°.

In many applications, the limitation of the pitch axis is tolerable, but the roll limitation is an impairing constraint. In the above application, for example, it is desired that the sensor has an unlimited rotation about the roll axis, because the cable bearing the magnetometers can be twisted and the sensors can achieve several 360° rotations. It will be understood that the conventional sensor is not adapted to such operation conditions, because the pendular system can abut and no more be able to reach the horizontal position. In other applications, a rotation higher than 120°, unlimited or not, will be desired.

SUMMARY OF THE INVENTION

An object of the present invention is to improve the rotation possibilities, along the roll axis, of the pendular sensors. A particular object of the present invention is to provide a sensor with an unlimited rotation along its roll axis.

To solve this problem, those skilled in the art can mount on the roll axis a rotating collector, such as those provided in some electrical motors, and to collect the electric information by means of friction brushes. However this solution is not satisfactory because the friction of the metallic brushes of the collector provides a resisting couple at least hundred times higher than the resisting couple of the roll-bearings. This will cause an intolerable horizontal positioning error for a highly accurate sensor.

A further object of the present invention is to provide a pendular sensor including a rotating collector, but whose horizontal accuracy is not impaired by the friction of the brushes against the rings of the rotating collector.

To achieve these objects, the present invention provides a sensor including a first pendular system articulated along a first axis, bearing at least a detector, a second pendular system articulated along a second axis collinear with the first axis, metal collector rings mounted around the second axis, and electrical wires connecting the detector terminals to the rings.

According to an embodiment of the invention, the first and second axes are rotably coupled through a mechanic coupling device having a determined angular clearance, the angular clearance being selected so that the first pendular system is, near its quiescent position, independent from the second pendular system.

According to an embodiment of the invention, the coupling device includes a fork-shaped part, fixed to an extension of the first axis, and a finger integral with the second axis, placed between the branches of the fork and having a thickness substantially lower than the distance between the two branches.

According to an embodiment of the invention, the sensor is mounted in a casing including a first water-proof cavity filled with a viscous liquid, in which is located the first pendular system, a second water-proof cavity, communicating with the first cavity, into which the extension of the first axis is accommodated, and in which is included the coupling device, and a third cavity into which ends, through a sealing joint, the second axis, and in which is located an electronic card connected to brushes in friction against the metallic rings.

According to an embodiment of the invention, the first and second axes are hollow and are axially crossed by electrical wires.

According to an embodiment of the invention, the first pendular system includes a frame integral with the first axis, and a support of the first detector, integral with another axis carried by the frame perpendicularly to the first axis.

The foregoing and other objects, features, aspects and advantages of the invention will become apparent from the following detailed description of the present invention when taken in conjunction with the accompanying drawings.

DETAILED DESCRIPTION

Figure 1:
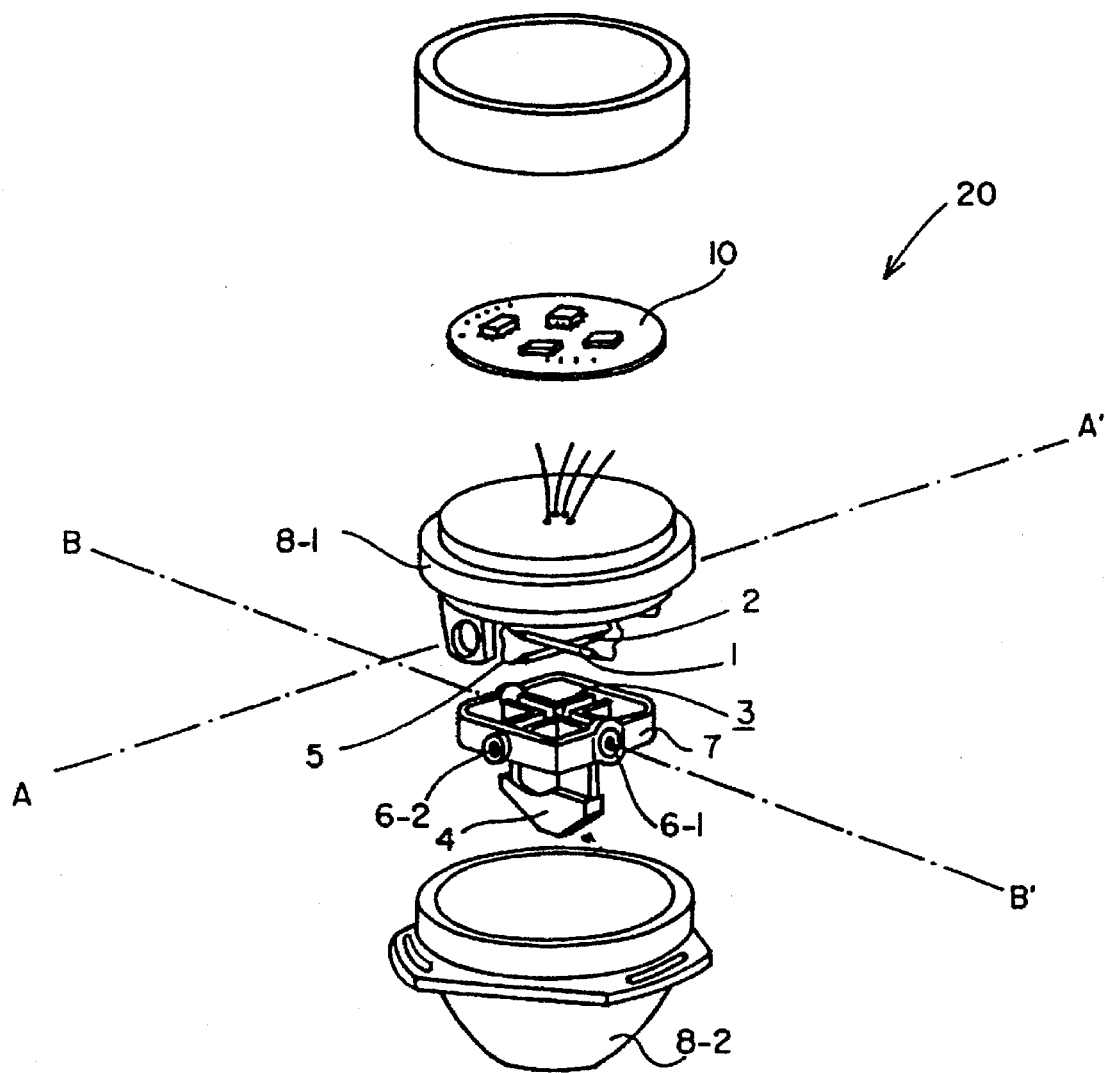
FIG. 1, above described, represents a conventional pendular magnetometer.
Figures 2, 3:
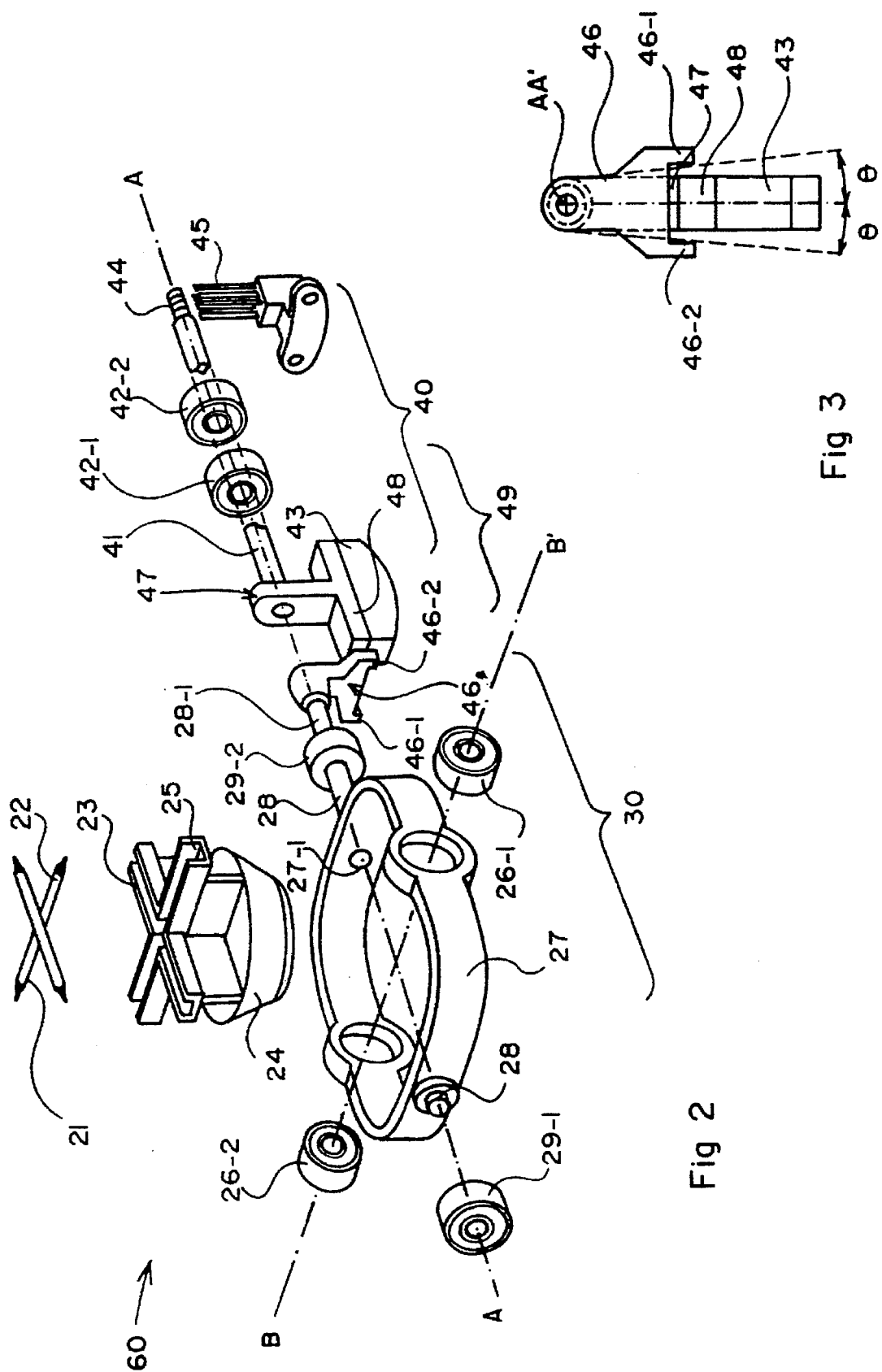
FIG. 2 is an exploded view of the mechanical portion of a pendular sensor according to the present invention.
FIG. 3 represents a portion of the sensor of FIG. 2.

FIG. 2 is an exploded view of the mechanical portion of a pendular sensor 60 according to the invention. Sensor 60 is a pendular magnetometer having two degrees of liberty and includes, like the conventional sensor of FIG. 1, two magnetic field detectors 21, 22 disposed perpendicularly one with respect to the other on a pendular support 23, horizontally maintained by a return mass 24. Support 23 is integral with a pitch axis 25 oriented along BB' with its ends guided in rotation by two roll-bearings 26-1 and 26-2 carried by a frame 27. Frame 27 is in turn integral with a roll axis 28 oriented along AA' perpendicular to BB', having its ends guided by two roll-bearings 29-1 and 29-2 carried by the sensor frame (not shown in FIG. 2). The above-described assembly constitutes a conventional pendular detection system 30.

According to a first feature of the invention, sensor 60 further includes a second pendular system 40, articulated through an axis 41 axially prolonging the roll axis 28 along AA'. Axis 41 is carried in its middle portion by two roll-bearings 42-1 and 42-2, disposed side by side. At one end of axis 41, facing the roll axis 28, the pendular system 40 includes a return mass 43, rigidly suspended to axis 41. Because of the counter weight constituted by the return mass 43, the system 40 is substantially shifted and a substantial distance is provided between the two bearings 42-1 and 42-2 to avoid too high efforts along axis 41. At its other end, axis 41 includes metallic rings cooperating with a set of fixed friction brushes 45 integral with the sensor frame.

This second system 40 constitutes a pendular collector which is advantageously independent from the pendular system 30. This first feature of the invention provides a pendular sensor having an extended rotation range. It is sufficient to connect detectors 21, 22 to the rings 44 of the pendular collector 40 through electrical wires, and to connect brushes 45 to an electronic card. When the sensor is tilted, the collector 40 occupies an angular position which is the image of the angular position of the detection system 30, so that the wires will not be twisted. In addition, the friction of brushes 45 on rings 44 of collector 40 will not affect the pendular system 30, because the two systems are independent. However, since immaterial means for holding the various bearings 29-2, 42-1, 42-2 do not exist, the wires will anyhow chock systems supporting the bearings, further to important rotations.

Thus, according to a second optional feature of the invention, axis 28 and 41 are hollow, and frame 27 includes an aperture 27-1 to access the inner portion of axis 28. Wires can thus be disposed in axis 28, then in axis 41, until they reach the conductive rings 44. Such an arrangement, combined with the first feature of the invention, provides a sensor with unlimited rotation along its roll axis. This advantage will clearly appear with the description of FIG. 4.

According to a third optional feature of the invention, to be preferentially implemented if the sensor can be subjected to rough rotations, one end 28-1 of the roll axis 28 of the pendular system 30 is prolonged beyond bearing 29-2, toward axis 41 of collector 40. A fork shaped system 46, including two branches 46-1 and 46-2 downwardly oriented, is integrally fixed at end 28-1. In addition, the return mass 43 of collector 40 is fixed to axis 41 through an axially oriented piece 47 having the shape of a reversed T, one branch of the T constituting a finger 48 which is located in the fork 46.

Thus, the T-shaped piece 47 and fork 46 constitute a mechanical device 49 that couples the rotating collector 40 with the pendular system 30. The thickness of finger 48 is substantially smaller than the distance between the branches 46-1 and 46-2. So, a clearance remains, whereby the pendular systems 30 and 40 have an angular liberty θ about their equilibrium position. This is illustrated in FIG. 3, which is an axial view along AA' showing fork 46, T-shaped piece 47, and angle θ.

It can be seen that, if the sensor is abruptly tilted around AA', the first of the two pendular systems 30, 40 which rotates causes the rotation of the second system. However, after the end of the rotation, when the two systems reach their respective quiescent position, they are again independent. Thus, the friction of brushes 45 on the rings 44, which unavoidably impairs the quiescent position of collector 40, has no effect on the quiescent position of the detection device 30. Of course, those skilled in the art should select a sufficient return mass 43 depending upon the intensity of the friction forces acting on axis 41, so that the quiescent position of the pendular collector has, with respect to the quiescent position of the pendular system 30, an angular difference lower than θ. Otherwise, the two systems remain mechanically coupled in their quiescent position.

Those skilled in the art can use various means to implement the coupling device 49, for example a gear including two pinions each integral with one end of one axis, and a linking tooth wheel engaging with clearance the two pinions. The advantage of the structure according to the invention is that the piece 47 is used both for angular coupling, through finger 48, and for the fixation of mass 43, thereby providing a smaller device.

Figure 4:
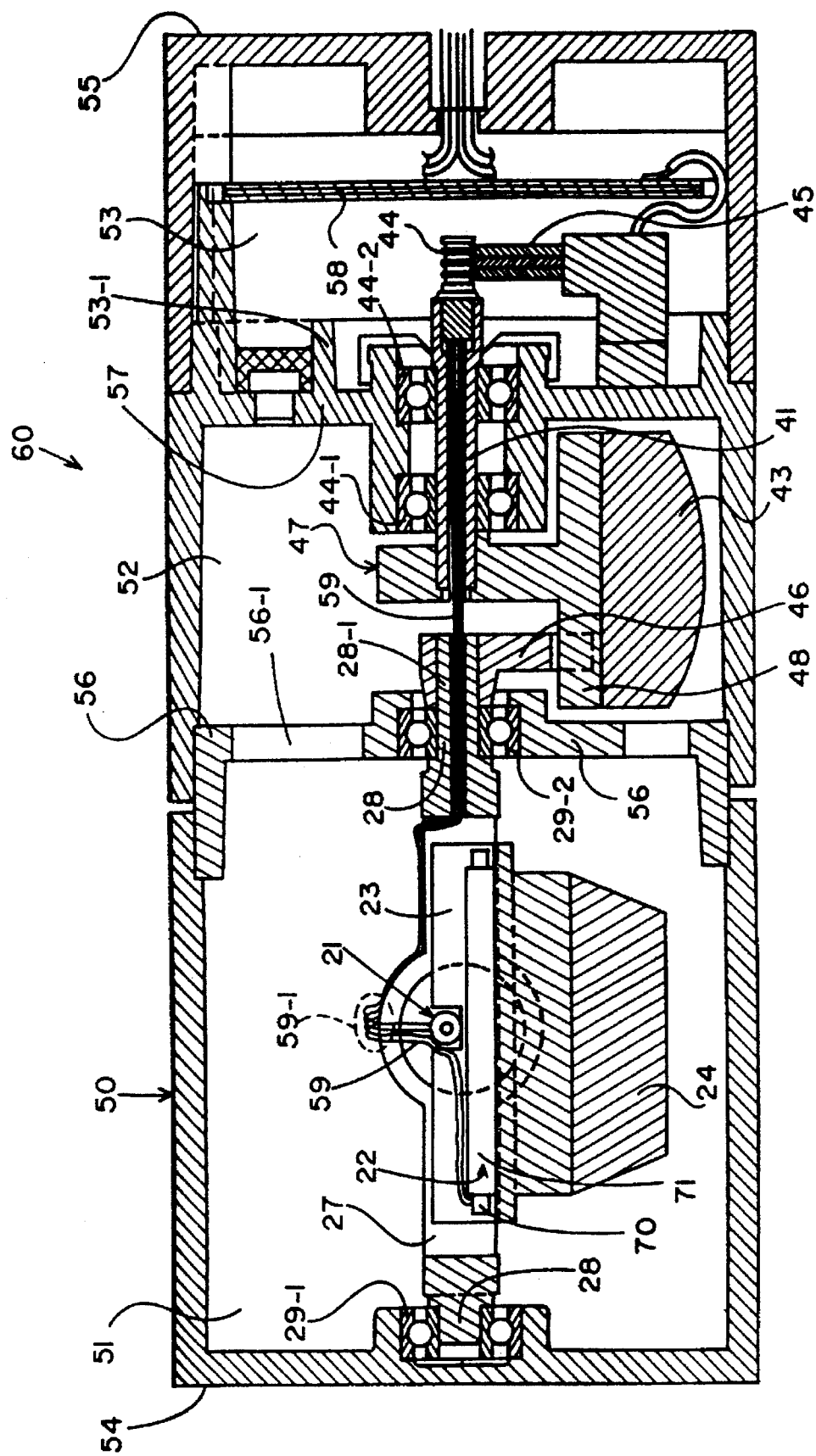
FIG. 4 is a cross-sectional view of the sensor of FIG. 2 included in a casing.

FIG. 4 is a cross-sectional view along line AA' of the whole sensor 60. The mechanical portion represented in FIG. 2 is included in a cylindrical casing 50 including three cavities 51, 52 and 53 delineated by a front flange 54 and a rear 55 flange of the casing, and two internal walls 56, 57. The pendular detection system 30 is included in the cavity 51 between flange 54 and wall 56, which carries the bearings 29-1 and 29-2 of the roll axis. The prolongation 28-1 of the roll axis goes through wall 56 and ends into cavity 52, in which the mechanical coupling device 49 and mass 43 of the pendular collector 40 are accommodated. The two bearings 42-1 and 42-2 of the collector are supported by wall 57, which separates cavities 52 and 53. Cavities 51 and 52 communicate through holes 56-1 across wall 56, and are filled with a viscous liquid such as silicon oil, ensuring damping and lubrication of the device. Axis 41 of the collector passes through the wall 57 and ends into the cavity 53 through a sealing joint 53-1 including a lip-like aperture which is in friction with the periphery of axis 41. It should be noted that the end of axis 41 has to be sealed to prevent the oil contained in cavities 51 and 52 from entering into cavity 53. The rings 44 of collector, the brushes 45 and an electronic card 58 are accommodated in cavity 53, Card 58 is electrically connected to detectors 21, 22 located in cavity 51) through brushes 45, rings 44, and wires 59. The wires are soldered with the rings inside axis 41 and they axially cross axes 41 and 28 towards cavity 51. In cavity 51, the wires are disposed along the frame 27; then, in an area 59-1 located over one of the longitudinal bearings 26-1, 26-2, the wires reach the support 23, before being connected to the detectors.

As shown in FIG. 4, the rotation around the roll axis of the sensor according to the invention is not limited. Whatever is the angular position of casing 50, the detection sensor system 30 and the collector 40 reach their respective horizontal quiescent position. So, the wires are not twisted. It should be noticed that position error of the collector, due to the brush friction, is negligible as regards the twist that it can introduce on the wires. In practice, a horizontal positioning accuracy of approximately 0.15° is obtained for the detection system 30, which is an excellent accuracy, and a positioning accuracy of the collector 40 of approximately 2° is obtained, an accuracy which would not be tolerable if it were the accuracy of the detection system.

In addition, it should be reminded that the angular coupling device 49 is necessary only if the sensor is designed to applications where it may be subjected to abrupt rotations along the roll axis. In this case, since the pendular system 30 and collector 40 have not the same reaction time duration, the angular coupling makes it possible to avoid a temporary twists of the wires. In practice, the angular degree of liberty, determined by the clearance of finger 48 in fork 46, can be selected within a range of preferred values from 5° to 10°.

According to an embodiment of the present invention, casing 50 has a length of approximately 10 cm and a diameter of approximately 5 cm. The mobile pieces, such as the axes, the frame, the fork, and so on, are made of molded plastics. The return masses are made of a high density steel, and the casing is made of aluminum or molded plastics. The roll-bearings are made of a non magnetic material, and the metal rings 44 are made of gold.

In the above description, detectors 21, 22 and electronic card 58 have not been described in detail for the sake of clarity, since they are well known by those skilled in the art. It should be succinctly reminded that a magnetic field detector, such as detector 21, 22, is fabricated from a hollow ceramic tube 70 in which is inserted the inner part of a magnetic core, and around which a simple solenoid 71 (FIG. 4) is wired. The excitation of the detector and the magnetic field measurement are ensured by the electronic card. Voltage pulses are cyclically applied to the detectors to positively or negatively saturate them. The magnetic field to be measured modifies the saturation conditions, which are analyzed by an electronic detection system included in the card, which provides information that are proportional to the magnetic field.

As is apparent to those skilled in the art, various modifications can be made to the above preferred embodiments. The invention generally applies to the fabrication of any type of sensor of an oriented physical parameter, including a support of a pendular system having one or two degrees of liberty. Similarly, this sensor can include one, two or even three detectors, if it is desired to measure the three space components of the physical parameter.

I claim:

1. A sensor (60) including:

a first pendular system (30) articulated along a first axis (28), bearing at least one detector (21,22), a second pendular system (40) articulated along a second axis (41) collinear with said first axis (28), metal collector rings (44) being mounted around the second axis, and electrical wires (59) connecting the terminals of the detector (21,22) to said rings, the rotation of the first (28) and second (41) axes being associated through a mechanic coupling device (49) having a predetermined angular clearance (θ), and the angular clearance being selected so that the first pendular system is, near its quiescent position, independent from the second pendular system.

2. The sensor of claim 1, wherein said coupling device (49) includes;

a fork-shaped part (46), fixed to an extension (28-1) of the first axis (28), and a finger (47, 48) integral with the second axis (41), placed between the branches (46-1, 46-2) of said fork, and having a thickness substantially smaller than the distance between said two branches.

3. The sensor of claim 2, mounted in a casing (50) including:

a first water-proof cavity (51) filled with a viscous liquid, in which is located the first pendular system (30), a second water-proof cavity (52), communicating with the first cavity, into which said extension (28-1) of the first axis (28) is accommodated, and in which is included said coupling device (49), and a third cavity (53) into which ends, through a sealing joint (53-1), the second axis (41), and in which is located an electronic card (58) connected to brushes (45) in friction against said metallic rings (44).

4. The sensor of claim 1, wherein the first (28) and second (41) axes are hollow and are axially crossed by said electrical wires (59).

5. The sensor of claim 1, wherein the first pendular system (30) includes:

a frame (27) integral with said first axis (28), and a support (23) for supporting the detector (21, 22), integral with another axis (25) carried by said frame (27) perpendicularly to the first axis (28).

* * * * *